(No Model.)

J. H. McILVEEN.
PORTABLE DAIRY.

No. 519,266. Patented May 1, 1894.

WITNESSES
Geo. E. Frech
Roland A. Fitzgerald

INVENTOR
James H. McIlveen
per Lehmann Pattison & Nesbit
Attys

UNITED STATES PATENT OFFICE.

JAMES H. McILVEEN, OF FAIRFIELD, TEXAS.

PORTABLE DAIRY.

SPECIFICATION forming part of Letters Patent No. 519,266, dated May 1, 1894.

Application filed August 26, 1893. Serial No. 484,078. (No model.)

*To all whom it may concern:*

Be it known that I, JAMES H. MCILVEEN, of Fairfield, in the county of Freestone and State of Texas, have invented certain new and useful Improvements in Portable Dairies; and I do hereby declare the following to be a full, clear, and exact description of the invention, such as will enable others skilled in the art to which it pertains to make and use it, reference being had to the accompanying drawings, which form part of this specification.

My invention relates to improvements in portable dairies, and it consists in the particular construction and arrangement of parts which will be fully described hereinafter and especially pointed out in the claim.

The object of my invention is to provide a portable dairy consisting of a frame-work, with a suitable number of racks or perforated shelves, and a bottom beneath these shelves above the lower ends of the frame, which bottom is insect proof, but permits a free circulation of air; to surround the frame with an imperforate cover, which is made of a material capable of capillary attraction; place a pan above the frame in which a cool liquid is placed, and provide the pan with an air opening, the lower end of the imperforated covering being above the support upon which the frame is placed, whereby air circulates freely through the shelves around the articles placed therein and thence through the pan, the article being kept cool by the wet cover.

Figure 1:
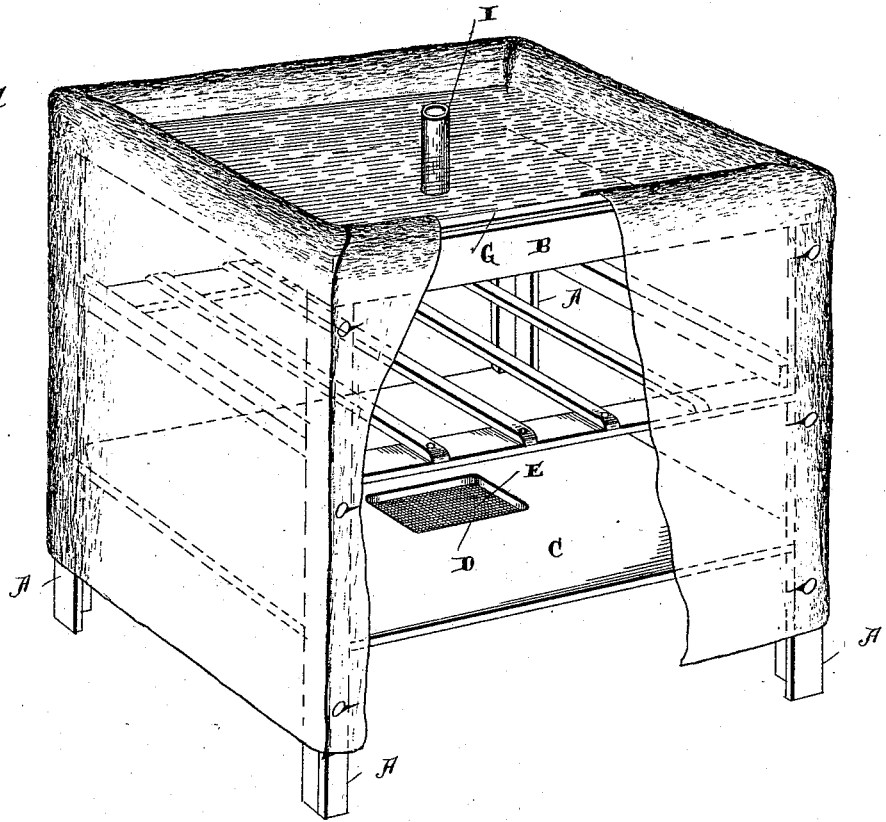
Figure 2:
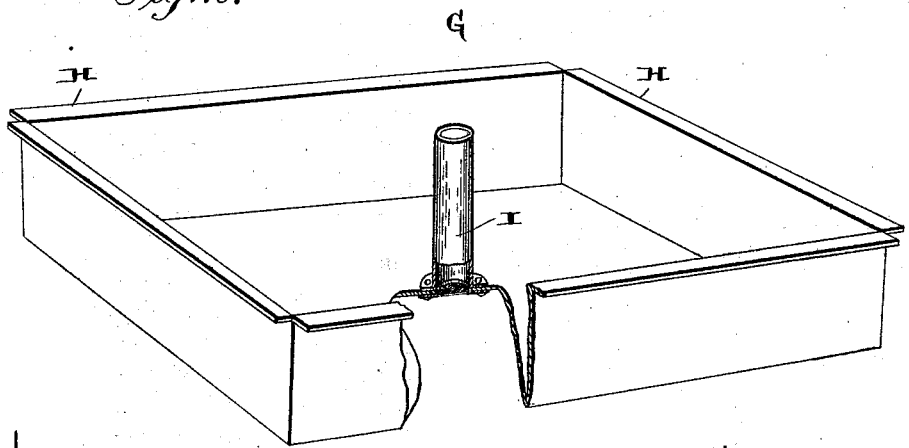

In the accompanying drawings, Figure 1, represents a perspective view of my invention, the cover being partially broken away. Fig. 2, is a detached perspective view of the pan.

A represents four standards or posts, which are connected at their upper ends by means of the bars B thus forming a rectangular frame at the upper end of said posts. The lower ends of said posts are connected by means of a bottom C which is provided with a central opening D, the said opening being covered by a wire gauze E, for the purpose of making the same fly proof. However, if desired, this entire bottom may be made of wire gauze, instead of being made solid with a central opening. Between the rectangular frame B and the top of the posts and the said bottom C, are a number of shelves which will vary according to the size of the dairy, any desired number being used. Placed within and supported by the rectangular frame B is a pan G which has at its upper edge a laterally extending flange H, which rests upon the upper edge of the said rectangular frame, thus making the said pan detachable for the purpose of conveniently cleaning the same. Extending from the bottom of the pan is one or more tubes I, which extend above the edge of the said pan. The opening formed by this tube is covered by a wire gauze, to make the same fly and insect proof.

Placed around the entire frame or dairy is a bag or cloth with its ends below the bottom C, but above the ground to allow a circulation of air. This sack is buttoned or otherwise fastened to the frame B, and one end made so that it can be opened so as to allow free access to the shelves of the dairy. The material of which this sack is made will be such as to readily take water from the pan G, by capillary attraction, the upper end of the said cloth extending into the said pan. It will thus be seen, that I produce a dairy having a side which is practically imperforate, but a perforated bottom left free for the circulation of air, so that air is compelled to pass from the bottom on up through and between the shelves and out the air circulation made by the tube I, extending from the bottom of the pan. The amount of circulation can be regulated by the size or the number of tubes I, which are used, so that cool air will be kept within the dairy, and only a sufficient circulation given to permit fresh air entering the same.

From the above description it will be seen that I produce a very simple and cheap portable dairy, in which a free circulation of air is permitted from the bottom only and through the pan. This construction prevents the blowing of dust and dirt through any side opening which might be provided for the purpose of ventilation, and also secures a better and more thorough circulation owing to the fact that it begins at the bottom and passes through all of the shelves and out at the top. Also, by this construction the cool air descends and is not allowed to pass out of the dairy except at the bottom, while the warm air is allowed a free access by ascension through the tubes in the pan. This construction prevents a waste of cool air which occurs where side ventilations are provided as will be readily understood.

Having thus described my invention, what I claim, and desire to secure by Letters Patent, is—

A portable dairy consisting of a framework having legs, a pan supported at the top of the framework, with a tube extending from the bottom of the pan and communicating with the interior of the frame, a perforated bottom for the said dairy, and an imperforate cloth surrounding the said dairy and extending below the said bottom but above the lower end of the framework to permit the circulation of air, the upper end of said cloth extending into the pan, substantially as described.

In testimony whereof I affix my signature in presence of two witnesses.

JAMES H. McILVEEN.

Witnesses:
FRANK. TATE, Jr.,
W. A. SHOCKLEY.